PHASE SYNCHRONIZER FOR A DATA RECEIVER

Filed Sept. 22, 1966 4 Sheets-Sheet 1

INVENTOR
JOHN S. CHOMICKI

BY Robert E. Sandt
ATTORNEY

Feb. 3, 1970 J. S. CHOMICKI 3,493,679

PHASE SYNCHRONIZER FOR A DATA RECEIVER

Filed Sept. 22, 1966 4 Sheets-Sheet 3

PHASE SYNCHRONIZER FOR A DATA RECEIVER

Filed Sept. 22, 1966 4 Sheets-Sheet 4

United States Patent Office 3,493,679

Patented Feb. 3, 1970

3,493,679

PHASE SYNCHRONIZER FOR A DATA RECEIVER

John S. Chomicki, Carteret, N.J., assignor to International Business Machines Corporation, Armonk, N.Y., a corporation of New York Filed Sept. 22, 1966, Ser. No. 581,200
Int. Cl. H04l 27/24
U.S. Cl. 178—67 11 Claims

ABSTRACT OF THE DISCLOSURE

A variable resolution phase adjustment apparatus where a data receiver operates with a bi-phase signal which has two transitions per bit period for a binary zero and one transition for a binary one, occurring at the middle of the period. The apparatus includes a free-running clock counter which divides the bit period into 32 timing periods and can reset at clock counts of 16, 4, 8, 12, 1, and 15. A phase counter counts the number of clock counts between a line transition and a clock count of 8 following a positive transition to measure the phase discrepancy. A phase count of 16 produces no adjustment. In the initial adjustment period, phase counts of less than 13 or greater than 20 cause the clock counter to reset at counts of 4 and 12, respectively, while in the final resolution period, phase counts less than 16 or greater than 16 reset the clock at counts of 1 or 15 respectively, to adjust the phase of the clock counter to the incoming data. The clock counter then gates the line data through the circuit logic to extract the data.

This invention relates to communication apparatus, and more particularly to an improved circuit for adjusting the timing of a coded data receiver to that of the received data.

The present invention, while of general utility, is particularly suited for use in a communication network having a central station and a plurality of remote terminals. In such a system the central station transmits a coded call signal on a transmission line common to all terminals. All of the terminals on the line decode the call signal, but only the called terminal responds by turning on its transmitter to send back a carrier signal to the central station on a return line, and by altering its data receiving circuits to receive command signals from the central station. All non-called terminals leave their transmitters turned off. When the carrier from the called terminal reaches the central station, the receiver thereat adjusts its timing to that of the returned carrier. This phase adjustment is achieved while the transmitter at the central station is transmitting the command signals to the called remote terminal. By the time the transmission of the command signals is complete, the phase adjustment of the central receiver is also complete. Thus, the central receiver is adjusted to be phase-locked to the remote terminal and ready for the data that the terminal will return to the central station in response to a command signal.

Because the remote terminals may be connected to any distance along the communication line, the turnaround time will vary according to the distance of the terminal from the central station. So as not to waste the available transmission time, it is desirable to adjust the phase of the receiver to the returned carrier in the minimum time, or at least before the remote terminal is ready to return the data commanded of it. If the polling of the remote terminals were relatively frequent, it will readily be appreciated that, if the phase adjustment period were to exceed the command signal period, much potential transmission time would be lost in synchronizing the central receiver to each different terminal as it would come onto the line.

The phase adjustment is achieved by employing a free-running clock counter and auxiliary circuitry in the receiver which effectively divide the data bit periods into M equal time intervals in a first period of coarse (Lo-Q) adjustment, and into N equal time intervals in a second period of fine (Hi-Q) adjustment. With the data modulation scheme employed, line transitions, the relative occurrence of which are data significant, occur invariably at the middle of the bit period and variably (depending on the data) at the beginning of the bit period. Thus in Lo-Q, the line transitions for a perfectly phased receiver occur at $M/2$ and M, while in Hi-Q they occur at $N/2$ and N. The values of M and N are so chosen that N is an integer divisible by four (for reasons to become apparent) and the ratio of $N/M$ (identified as the clock correction factor, K) is also an integer. If a clock counter capable of counting to $N/2$ twice per cycle and resetting automatically is employed, the line transitions will occur only at a clock count of $N/2$ for a perfectly phased system.

By counting the clock intervals (on a scale of N per period) which occur in two successive periods between two successive line transitions and the corresponding next following clock count of $N/4$ (in a clock counter of $N/2$ count capacity), a perfectly phased receiver will produce a phase count of $N/2$. If the phase count is less than $N/2$, the clock counter must be retarded to bring it into phase with the data signal. If the phase count is greater than $N/2$, the clock counter must be advanced to bring it into phase with the data signal. The clock counter is retarded by resetting it at a predetermined count following its normal reset at its maximum count of $N/2$. Conversely, the clock counter is advanced in phase by resetting it at a predetermined count in advance of its normal reset at its maximum count of $N/2$. Whether, in fact, the clock counter is retarded or advanced for phase counts less than or in exces of $N/2$, depends on whether the receiver is operating in the Hi-Q or the Lo-Q mode. If the receiver is operating in the Hi-Q mode, the clock counter will invariably be retarded by resetting it at a clock count of one, following the normal reset at $N/2$, if the phase count is less than $N/2$. Conversely, the clock counter will be reset at $N/2-1$ if the phase count is greater than $N/2$. In Lo-Q the clock counter will be retarded only if the phase count is equal to or less than $N/2-K$. It will then reset at a count of K following a normal reset at $N/2$. Conversely, in Lo-Q the clock counter will reset at $N/2-K$ for a phase count greater than $N/2+K$.

In the preferred embodiment, N is equal to thirty-two, and M is equal to eight. Thus, the resolution in Hi-Q is one part in thirty-two, while in Lo-Q, it is one part in eight, a ratio (K) of four to one. Since a line transition should occur at the beginning or middle, or both, it will readily be appreciated that the phase mal-adjustment cannot exceed $N/4$ counts, because adjustment can be achieved in either direction. Thus, if the maximum discrepancy is $N/4$ counts, and corrections can be made in steps of K counts, then the number of correction periods required in Lo-Q will theoretically be no greater than $N/4K$ for normal operating conditions. In practice, however, as will be explained, this theoretical condition is exceeded under some special initial circumstances.

Expressed in another form, the phase adjustment circuits of this invention effectively segment the bit period into successive halves, and each half into further first and second quarters, each quarter being effectively divided into $M/4$ equal periods in a first period of adjustment, and into $N/4$ equal periods in a second period of adjustment. The circuits further provide two respective null periods, the first of which periods persists for K out of N counts duration disposed with one count period in the beginning of first quarter and $K-1$ counts at the end of the second quarter in the Lo-Q mode of operation, and a second null period of one out of N counts duration at the end of the second quarter-bit period in the Hi-Q mode of operation. If a line transition occurs in the first quarter, the receiver phase will be retarded if the transition also occurs outside the Lo-Q null period. If a line transition occurs in the second quarter and also outside of the Lo-Q or Hi-Q null period, the phase of the receiver will be advanced. The amount of the adjustment will be in steps of K out of N counts in Lo-Q and by steps of one out of N counts in Hi-Q. Thus, by providing null periods of two different respective durations corresponding to the magnitudes of the phase adjustments in the two modes of adjustment, the phase of the receiver will first be rapidly adjusted in coarse steps to the nearest position to synchronism without over-adjustment, followed by less rapid adjustment in fine steps to achieve and maintain perfect phase adjustment.

Once the clock counter is phase-synchronized with the incoming line signal, it is then available to time the extraction of data from the line signal. This it achieves by timing the comparison of the relative phase of successive pairs of datum bit signals. If the phase of one bit is identical to that of the preceding bit, the second bit has one binary significance, if different, the opposite binary significance.

In furtherance of the foregoing operation of the synchronizing circuits, it is an object of this invention to provide in a binary data receiver means for measuring the phase discrepancy between the data signal and a free-running data clock in the receiver and advancing or retarding the phase of the clock in response to such measurement in combinations of coarse and fine adjustments to achieve phase synchronization in the minimum elapsed time.

It is a further object of the invention to provide in a binary data receiver means responsive to the data signal itself for synchronizing the timing of the receiver's operation with the data signal, including a clock counter operating to produce a predetermined number of clock counts per data bit period, means for comparing the phase of the clock counter with that of the incoming data, and means responsive to the comparison for adjusting the relativity of the clock counter to the data signal in successive steps of two different magnitudes, to thus achieve rapid adjustment of the phase of the clocking means to that of the data signal.

Another object of the invention is to provide in a data receiver means responsive to a bi-phase data-bearing signal for adjusting the phase of the receiver to that of the line data signal with two successive degrees of adjustment resolution wherein there is provided in the receiver means for segmenting the bit period into halves and each half into first and second quarter-bit periods, means for establishing within these quarter-bit periods null periods of two different respective durations, means for detecting the presence of a transition in the line signal within the respective quarter-bit periods and without the respective null periods, means for producing signals manifestive of the four combinations of possible line transition positions, and means under control of these signals for retarding or advancing timing circuits within the receiver to adjust its operation to be in phase with the line signal.

Yet another and more specific object of the invention is to provide in a data receiver means responsive to a bi-phase data-bearing line signal for adjusting the phase of the receiver to that of the line data signal with two successive degrees of adjustment resolution wherein there is provided in the receiver a free running clock counter operable to accumulate sixteen counts in a period substantially equal to a half bit period, a phase counter, a bi-stable device switched to the state of the line signal under control of the clock counter at a clock count of eight, an EXCLUSIVE OR gate operable to compare the line status and the status of the bi-stable device and gate clocking pulses to the phase counter for the duration of the mis-comparison, means responsive to a transition of the bi-stable device in a single given direction for resetting the phase counter and producing signals manifestive of count therein prior to reset respectively greater than sixteen, less than sixteen, greater than twenty, and less than thirteen, means initially operable responsive to a signal manifesting a phase count greater than twenty for resetting the clock counter at a clock count of twelve, means initially responsive to a signal manifesting a phase count less than thirteen for resetting the clock counter at a clock count of four, means operable in a subsequent adjustment period responsive to the signals manifesting a phase count greater than sixteen and less than sixteen for resetting the clock counter at clock counts of one and fifteen respectively, whereby the clock counter when so adjusted is synchronized with the data signal to provide the timing control for the extraction of binary data therefrom.

The foregoing and other objects, features and advantages of the invention will be apparent from the following more particular description of a preferred embodiment of the invention, as illustrated in the accompanying drawings.

Figure 1:
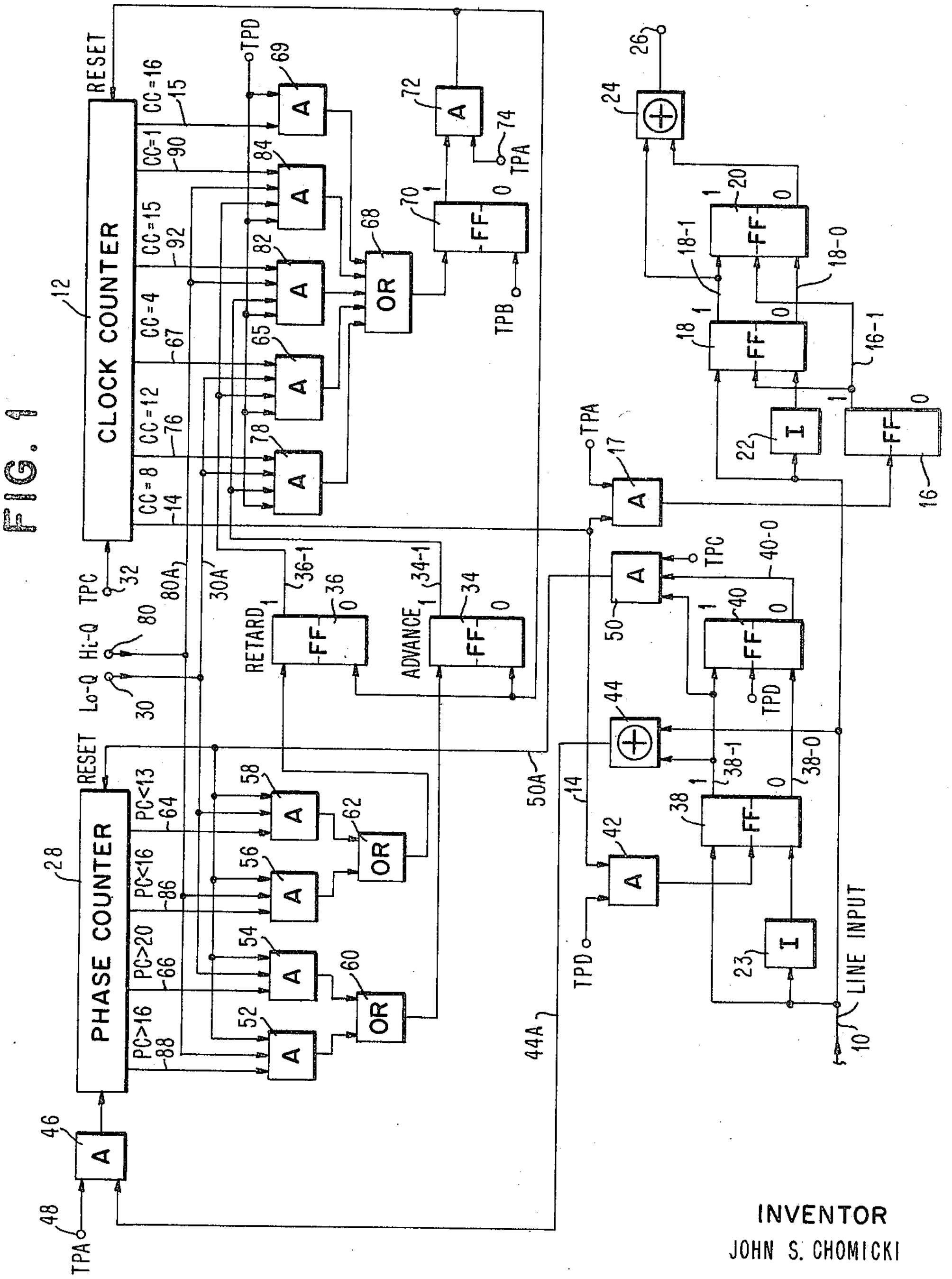
FIG. 1 is a schematic circuit diagram of the invention.

Before proceeding with an explanation of the operation of the circuits of FIG. 1, it is necessary to set forth the nature of the signals which are transmitted on the data line 10. These signals are bi-phase in nature, which, in addition to conveying the binary data, provide the requisite information to adjust the phase of the receiver to that of the incoming data. Each datum which is transmitted on the line 10 consists of a half bit period of a relatively positive potential and a half bit period of a relatively negative potential, either in the sequence stated, or in the converse sequence. A binary zero datum bit is invariably transmitted with the identical phase of the bit preceding it, while a binary one datum bit is transmitted with a phase opposite to that of the bit preceding it. Thus a binary zero datum bit has two transitions per bit period, one at the beginning of the bit period and one at the mid-bit period. A binary one datum bit has only a single transition per bit period, at the middle of the bit period. A continuous succession of all zeros produces a carrier wave having a frequency equal to the bit rate. A succession of all one bits produces a square waveform of half the bit rate.

With the foregoing relationships it will readily be appreciated that if the polarity of the transmission line is sampled at the same time in every bit period and the polarity of two successive samples compared, then a comparison (like polarity) will indicate that the second-occurring sampled bit is a binary zero datum bit. A miscomparison (unlike polarity) between the sampled polarities will indicate that the second-occurring sampled bit is a binary one datum bit. Since the sense of the datum bit is relative to the previous bit it will be apparent that the first bit transmitted will be indeterminate. If, however, a carrier wave (all zeros) is transmitted initially (as, in fact it is) to synchronize the receiver, then the data which follows the synchronizing period will be recovered without error.

Turning now to the circuits of FIG. 1 for recovering the data from the line 10, it is assumed that the phase of the receiver has been adjusted to that of the incoming signal on the line 10. In this state, the clock counter 12 counts from one to sixteen (a four stage binary counter) is a continuous cycle to yield sixteen count periods per cycle. The count of the clock counter has been adjusted during the phase adjustment period so that the count of sixteen occurs at the beginning and at the middle of the bit period. When the counter 12 begins the count of eight, the line 14 undergoes a positive excursion and remains positive for that one clock count period only. The positive transition of the line 14 complements the trigger 16 at TPA time through AND 17. The output line 16–1 from trigger 16 is positive when the trigger is in the binary one state and negative (or ground) when it is in the binary zero state. Thus, trigger 16 operates as a frequency divider to produce a positive-going excursion on the line 16–1 every other cycle of the clock counter 12. Expressed in another manner, line 16–1 produces a positive-going excursion every thirty-two counts of the clock counter 12, at a clock count of eight thereof. The positive condition of line 16–1 (through AND 17 at TPA time) gates triggers 18 and 20 to follow the state of the conditioning potentials applied thereto. Trigger 18 has its one input line connected to the input line 10, and its zero input line connected via the inverter 22 to the line 10. Thus, at $CC=8$ (clock counter equals eight) in every other cycle of the clock counter 12 the trigger 18 will switch to correspond to the polarity of the line 10. It thus samples the line polarity. A positive line polarity sets trigger 18 to a binary one condition while a negative line polarity resets trigger 18 to the zero state. Trigger 20 when it receives the positive pulse from line 16–1 switches to a state corresponding to that of trigger 18 just prior to the gating pulse. Thus, if trigger 18 changes state at a given clock count of eight, the trigger 20 will not switch state at that time, but at $CC=8$ thirty-two counts (one bit period) later. This occurs because the output lines 18–0 and 18–1 prime the trigger 20 to operate when gated by a positive-going excursion. These priming potentials are D.C. levels and the change in level of the prior cannot effect the state of the next trigger. Expressed in another fashion, the positive wavefront provides the gating for both triggers 18 and 20. By the time the trigger 18 switches, the positive wavefront gating pulse to switch trigger 20 will have disappeared. Consequently, trigger 20 can follow the state of trigger 18 by one bit period only. By comparing the states of triggers 18 and 20 in the EXCLUSIVE OR gate 24, the data can be recovered, and appears on the data hub 26.

Figure 2:
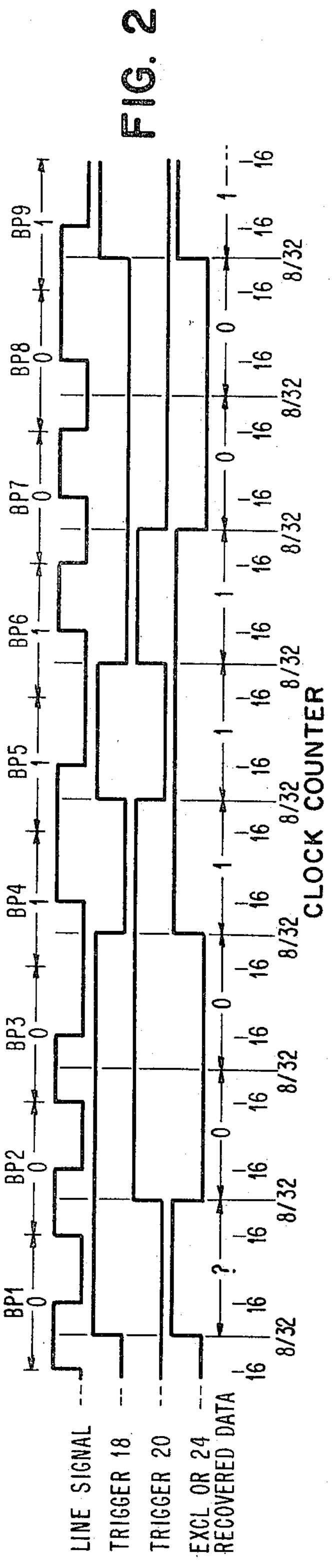
FIG. 2 is a timing diagram of the data extraction circuit of FIG. 1 showing a sampling of the line signal at the quarter-bit period with a first positive line transition.

When a transmitter comes on line and begins the transmission of carrier (all zeros) the first line transition may be either positive-going or negative-going. Since bi-phase modulation depends solely on the relativity of the phase of a datum bit signal to that of the previous datum bit signal, the first transition is of no moment. This actually permits transmission lines to be crossed, as polarity has no significance. This will be better appreciated if one examines FIGS. 2, 3 and 4 which show the same line data being transmitted. In FIG. 2 the first transition is a positive excursion while in FIGS. 3 and 4 the first transition is negative. It will be noted that in FIGS. 2 and 3, the line sampling is effected at $CC=8$ at the end of the first quarter of the bit period while in FIG. 4 the sampling is effected at $CC=8$ at the end of the third quarter of the bit period. This can occur depending on which state the trigger 16 occupies when the data comes on the line 10. The receiver will lock its phase in either of the two positions, but once it locks into phase, it will retain its adjustment.

In FIG. 2 the line signal is initially down, and it may be assumed that because of the long quiescent state triggers 18 and 20 will initially be reset. This gives rise to like inputs to EXCLUSIVE OR 24 to yield no output when the line is quiescent. When, during B1, trigger 18 is set to correspond to the line polarity at $CC=8$, the outputs of triggers 18 and 20 will mis-compare to activate the EXCLUSIVE OR 24 starting at $CC=8$ of B1. This makes it appear that the first transmitted bit is a binary one when it was not so intended. This occurs because the line sampling finds a change in the polarity at $CC=8$. This confirms the statement previously made that the sense of the first bit is indeterminate. When, however, at $CC=8$ of B2 the line polarity is sampled, it is positive (same as the polarity one bit earlier). Thus, trigger 18 remains set to the one condition. Trigger 20, previously reset, now sets to the one state at $CC=8$ of B2. Triggers 18 and 20 are now in the same state (both set) so that EXCLUSIVE OR 24 yields no output starting at $CC=8$ of B2 and continuing to $CC=8$ of B4 (two bit periods). Thus, two of the first three bits are manifested as zeros. At $CC=8$ of B4 trigger 18 resets to zero, while trigger 20 remains set. At $CC=8$ of B5 trigger 20 sets to one correspond to the priming condition of trigger 18 just before the onset of $CC=8$. Also at $CC=8$ of B5 trigger 18 switches. At $CC=8$ of B6, trigger 18 resets to zero, while trigger 20 sets to a one condition, to maintain the mis-comparison from $CC=8$ of B4 to $CC=8$ of B7. At $CC=8$ of B7, trigger 20 resets the zero to bring both triggers into a like state (both reset), to yield the requisite binary zero output at the data hub 26.

Thus, in FIG. 2 (and in FIG. 3) the data output lags the data input by eight clock counts, and the sampling is effected by comparing the line polarity at the middle of the first half bit period of two successive bits. If the polarity is the same, the second bit is a binary zero; if different, a binary one. Whenever a binary zero occurs, the trigger 18 remains in its previous state (at least after the first bit) when the sampling pulse occurs at $CC=8$ on line 16–1. The trigger 20, on the other hand, will retain its previous state for a binary zero only if the preceding bit were also a zero. If the preceding bit were a binary one, trigger 20 switches states at $CC=8$ in the bit period in which a binary zero is transmitted. For a binary one following a binary zero trigger 18 changes state, while trigger 20 retains its state. For a binary one following a binary one, both triggers 18 and 20 switch. Expressed in tabular form, the changes in state of the triggers 18 and 20 for the various permutations of data bits is as follows:

| Data | Trigger 18 | Trigger 20 | Exclusive OR 24 |
|---|---|---|---|
| 0 | ? | ? | ? |
| 0 | 1 | 1 | 0 |
| 0 | 1 | 1 | 0 |
| 1 | 0 | 1 | 1 |
| 1 | 1 | 0 | 1 |
| 1 | 0 | 1 | 1 |
| 0 | 0 | 0 | 0 |
| 0 | 0 | 0 | 0 |
| 1 | 1 | 0 | 1 |

Figure 3:
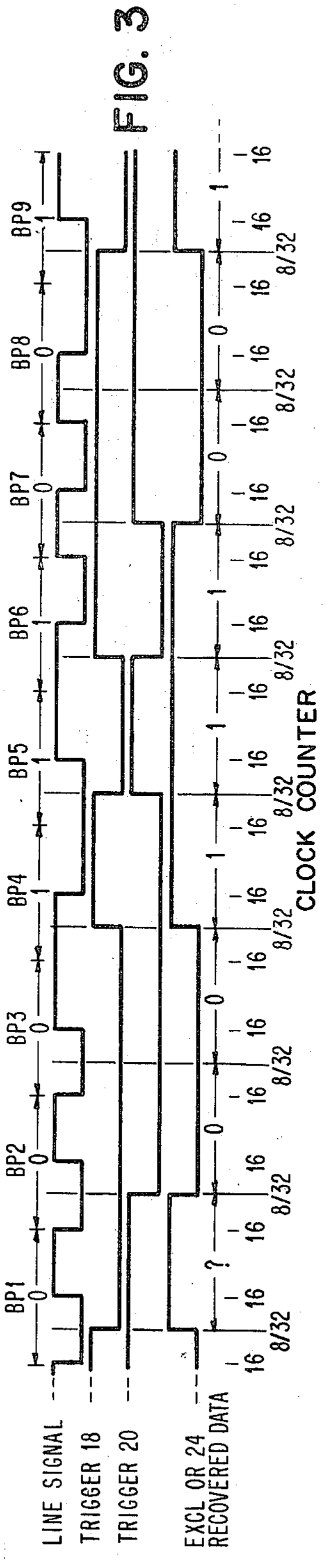
FIG. 3 is a timing diagram of the data extraction circuit of FIG. 1 showing a sampling of the line signal at the quarter-bit period with a first negative line transition.

In FIG. 3 the condition for a first transition of the line 10 in the negative direction is illustrated. Again, as in FIG. 2, the first bit is indetermine. The only difference between FIG. 3 and FIG. 2 is that the respective states of the triggers 18 and 20 are reversed between the two figures. Since it is only the relative states of these triggers that produce the data extraction, this polarity reversal between the two figures is immaterial.

Figure 4:
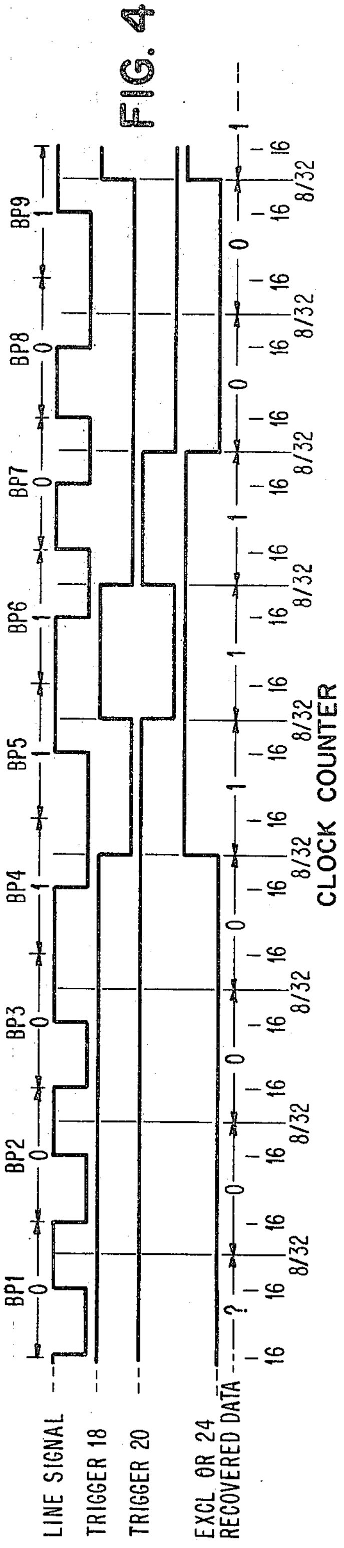
FIG. 4 is a timing diagram of the data extraction circuit of FIG. 1 showing a sampling of the line signal at the ¾ bit period with a first negative line transition.

In FIG. 4 the condition for line sampling at the middle of the second half of the bit period is illustrated. This yields the same data extraction (as perforce it should), but with a delay of twenty-four clock counts. All other relationships are preserved.

In the foregoing explanation of the operation of the data recovery circuits, it was assumed that the clock counter 12 was phased with the incoming data so that the line transitions occurred at a clock count of sixteen. A study of FIGS. 2 through 4 will reveal that perfect synchronism is actually unnecessary. For example, if the clock counter were operating within three counts on either side of the in-phase position, the line sampling would still find the line in the same condition. However, any communication line is always noisy, and the necessity for data integrity requires that the phase be accurately maintained. Because of the continuous phase adjustments, the statistical chances of noise causing a mis-operation of the circuits is minimized. Once phase adjustment is achieved, the chances of noise occurring at the instant of lime sampling and of a polarity that appears like a datum condition is considerably reduced. For example, if the line were correctly positive at $CC=8$ sample time, a negative noise signal at that instant and of sufficient strength to overshadow the positive line condition would be required to produce a mal-function. It will readily be appreciated that an occasional noise signal might produce this result, but the chances of recurrent noise signals occurring at the instant of the sampling is indeed remote.

Having established that data can be recovered from the line 10, provided that the clock counter 12 is synchronized with the incoming data, it is now proper to explore the further circuits in FIG. 1 which adjust the phase of the clock counter to that of the line signal. Before getting into the circuit details, however, it is well to examine the basic mode of operation. The clock counter 12 is stepped from a free-running clock pulse generator (not shown) which produces one hundred and twenty-eight clock pulses per bit period. These pulses are grouped in thirty-two groups of four each, labelled TPA, TPB, TPC, and TPD in FIG 1, to yield the basic thirty-two groups of counts per bit period. The clock counter 12 is incremented by each TPC pulse so that it counts from one to sixteen, twice per bit period, and automatically recycles through AND 69 at TPD time. Provision is made for resetting the clock counter at clock counts of twelve or fifteen to advance the phase of the counter with respect to the data, and at clock counts of four or one to retard the phase of the counter. The reset at $CC=12$ or $CC=4$ is effected initially in the so-called "Lo-Q" operation to achieve very rapid or coarse adjustment. The reset at $CC=15$ or $CC=1$ is achieved in the so-called "Hi-Q" operation to achieve a fine, or vernier, adjustment following the coarse adjustment, and to maintain the receiver in phase with the data throughout the data transmission period. The need for phase adjustment arises when the phase count in the phase counter 28 is other than sixteen. This counter is a five stage counter capable of counting to thirty-two. If the receiver is perfectly phased, the phase counter 28 accumulates two counts of eight counts each to produce a total count of sixteen. This results in no adjustment and allows the clock counter to recycle in the normal fashion on the next pulse following a count of sixteen. If the phase count is less than sixteen, the receiver clock requires retardation. If the phase count is greater than sixteen, the receiver clock requires advancement. Whether such adjustment is, in fact, made depends on whether the receiver is operating in the Hi-Q or Lo-Q mode. If it is in Hi-Q, the adjustment is invariably made by resetting the clock counter at a clock count of one (retard) or at a clock count of fifteen (advance) respectively. If the receiver is operating in Lo-Q then the adjustment will be made only if the phase count is less than thirteen (retard) or greater than twenty (advance) to reset the clock counter at a count of four or twelve, respectively. With these capabilities and the fact that the maximum lack of synchronization can only be eight counts, the system can theoretically lock into synchronism within three bit periods. A phase difference of eight counts can be corrected by either two advances of four counts each or two retards of four counts each. Depending on the direction of the first line transition and upon the incidence of noise on the line prior to the beginning of the carrier transmission, the circuits may operate in either direction. They are designed, however, to favor a retard action as will be seen when various examples are explored. For further combinations of mis-alignments, the Lo-Q adjustment will always bring the receiver into close synchronism for final adjustment in Hi-Q. For a seven count mis-alignment, correction is achieved by two four-count adjustments in one direction followed by a one count adjustment in the reverse direction. Six counts is corrected by two four-count retards followed by two one-count advance corrections. Five counts of discrepancy is adjusted by a four count adjustment and a one count adjustment. Three counts are corrected by a four count in one direction followed by a one count in the reverse direction. Thus at the end of Lo-Q operation, the phase difference can never be greater than two counts. The foregoing are ideal operations and may not be achieved in actual practice. Just as the first transmission cannot be identified as a binary datum bit, so, too, in the phase adjustment period the first correction may be in the wrong direction because of prior existing conditions. This is always corrected and the subsequent remedial action is properly taken.

Turning now to FIG. 1, the line 10 is assumed to have all binary zeros transmitted thereover initially, and the hub 30 is potentialized by circuits (not shown) to cause the circuits to operate in the Lo-Q mode. As a further point of departure, it is assumed that the clock counter 12 is free-running and stepped at TPC time (from hub 32) thirty-two times per bit period with an automatic reset after sixteen counts through AND 69 with inputs TPD and a line from 15 the counter 12 signalling a sixteen count. The phase counter 28 is initially reset to an all ones condition (actually thirty-two or zero) and is dormant. The advance and retard triggers 34 and 36 are initially reset as are the transition detector trigger 38 and the interlock trigger 40. The clock counter 12 is assumed to be out of phase.

With the foregoing conditions precedent, the first positive transition of line 10 will be followed by sixteen counts of positive line polarity. At some time during this duration, the line 14 will become positive (at $CC=8$). At TPD time of $CC=8$, AND gate 42 will be activated to gate trigger 38 on (line 10 is assumed positive). Since the delay between the initial line transition and the next occurring $CC=8$ pulse cannot be greater than sixteen counts, the probability of the first action being a retard one is great. As soon as line 10 goes positive with trigger 38 remaining reset, the polarities of line 10 and line 38–1 will differ. This difference will activate the EXCLUSIVE OR 44 for the duration of the delay until $CC=8$ occurs. The output on line 44A will operate AND 46 in the next following clock time at TPA (on hub 48) to apply an incrementing pulse to the phase counter 28 and at every succeeding TPA time until $CC=8$. At TPA time of $CC=8$, the phase counter 28 receives its last incrementing pulse because at TPD of $CC=8$, trigger 38 is set to equal the line condition and inactivate EXCLUSIVE OR 44. When trigger 38 sets at TPD of $CC=8$, it conditions line 38–1 and trigger 40. At TPD of the next following clock time ($CC=9$), interlock trigger 40 switches to follow the state of trigger 38. Thus from TPD of $CC=8$ to TPD of $CC=9$, triggers 38 and 40 disagree. By combining the outputs 38–1 and 40–0 therefrom in AND 50 together with a TPC pulse, this AND gate will be activated at TPC and $CC=9$ only following a positive line transition. Thus, this gate can yield an output no oftener than once per bit period, and it may produce an output as seldom as every other bit period (all ones). Whenever AND 50 yields an output, it potentializes line 50A to reset the phase counter 28 to a count of thirty-two (all ones). It also applies a potential to AND gates 52, 54, 56 and 58. Since in Lo-Q hub 30 is potentialized, as is line 30A, only AND gates 56 and 58 can respond, and these as a function of the phase count. If the phase count is less than thirteen, line 64 will be potentialized to activate AND 58. If the phase count is greater than 20, line 66 will be potentialized to activate AND 54. A pulse count of less than thirteen, activating AND 58 operates OR 62 to set the retard trigger 36. A greater than twenty phase count operates AND 54 and OR 60 to set the advance trigger 34. The retard or advance triggers 36 or 34, if they are to be set, set at TPC of $CC=9$ following a positive transition of line 10. The phase counter also resets at this time but delivers its control before resetting.

If either of the triggers 36 or 34 is set, a reset of the clock counter 12 will follow. If the retard trigger 36 is set, the clock counter 12 will first recycle normally following the sixteenth count and will reset again at $CC=4$, actually at TPA time preceding the TPC incrementing pulse to change $CC=4$ to $CC=5$. This is achieved by combining in AND 65 the lines 36–1, 30A, TPD, and 67, the last-named of which is potentialized at $CC=4$ by counter 12. The AND gate 65 operates OR 68 to set the counter reset trigger 70 at TPD time of $CC=4$. Trigger 70 conditions AND 72 for energization at TPA time of $CC=4$ (from hub 74), to apply a reset pulse to the clock counter 12 and also to reset the retard trigger 36.

If the advance trigger 34 had been set, then line 34–1 would be potentialized and combined with line 30A, TPD and line 76 (up at $CC=12$) to operate AND 78, OR 68, trigger 70, AND 72 to reset the clock counter 12 and the advance latch 34 at TPA following a clock count of $CC=12$. Thus, in Lo-Q the clock counter will reset a clock count of four or twelve if the phase count is less than thirteen or greater than twenty. Phase counts within the null zone ($PC=13$ to $PC=20$) will produce no adjustment.

When the system is operating in Hi-Q, the hub 80 and line 80A will be potentialized. This renders the AND gates 52, 56, 82 and 84 potentially active. If now at TPC of $CC=9$, line 50A is potentialized and the phase count is less than sixteen, line 86 will be potentialized to operate AND 56, OR 62, and retard trigger 36. The clock counter 12 will now reset normally at sixteen (through AND 69) and again at $CC=1$ by operation of AND 84 through lines 36–1, 80A, TPD, and line 90 ($CC=1$). The AND gate 84 will operate OR 68, trigger 70, AND 72 to reset the clock counter 12 and the retard trigger 36 in the manner described above but at a clock count of one instead of four, thus retarding the phase or the receiver by one clock count instead of four, as in Lo-Q.

If, when a phase counter reset is signalled in Hi-Q operation the phase count is greater than sixteen, then line 88 will cause AND 52 to set the advance trigger 34 which, in turn, activates AND 82 to reset at $CC=15$ (from line 92). A clock count within the null zone ($CC=16$) causes no remedial action.

The lines 64, 66, 86, and 88 from the five stage phase counter 28 are actually lines from logical elements that combine the presence and absences of the requisite binary signals in the counter. An output of line 64 ($PC<13$) will also result in an output on line 86 ($PC<16$), but the "Q" adjustment on lines 30A or 80A causes the correct selection. Similarly, if line 66 ($PC>20$) is potentialized so, too, will line 88 ($PC>16$). The converse situation, however, does not obtain, although the "Q" selection would cause the proper selection. For example, fourteen is less than sixteen, but not less than thirteen. Thus, line 86 can be positive while line 64 remains negative.

The trigger 38 is set or reset either directly from line 10 or through inverter 23 at $CC=8$ of every half bit period, because the counter 12 counts to sixteen twice per bit period. This delay in switching trigger 38 yields an output from EXCLUSIVE OR 44 from the line transition to $CC=8$, thus accumulating counts in the phase counter 28. Since the phase counter is reset only following a positive line transition (trigger 38 ON, trigger 40 OFF), the phase counter cannot reset oftener than once per bit period because there can only be one positive transition per bit period. Since $CC=8$ occurs twice per bit period, the phase counter will count two period from two successive line durations to the next following $CC=8$. Thus, since $CC=8$ occurs at the middle of both halves of the bit period and the line transitions ought to occur at the beginning and the middle of the bit period, a perfectly phased system will yield two counts of eight or sixteen. Greater or lesser counts will yield the action previously described.

Thus, the circuits of FIG. 1 are free-running at approximately thirty-two times the bit frequency (128 if one considers the timing pulses) to break up each bit period into thirty-two time increments. In Lo-Q operation, the phase of the clock counter is adjusted in increments of four counts to bring the phase of the counter as close to synchronism as possible with this coarse resolution without overcorrecting. In Hi-Q operation, adjustment is made in one count steps to achieve perfect synchrony, wherein the line transitions occur at a clock count of sixteen. Since the clock counter cycles twice per bit period and a line transition occurs at least once per bit period (binary one) and may occur twice per bit period (binary zero) a transition will always coincide with a clock count of sixteen for perfect synchrony. To measures the necessity for a change, the phase counter counts the number of clock pulses occurring between a line transition and $CC=8$ following a positive transition of the data line. If this count is less than sixteen, a retard action is indicated, if greater than sixteen, an advance action. Whether any action is in fact taken depends on the system "Q" and the magnitude of the discrepancy. If, in Lo-Q, the phase count is within the null zone ($PC=13$ to $PC=20$) no action will be taken. In Hi-Q remedial action will invariably be taken if the phase count is other than sixteen.

In the above description, the hubs 30 and 80 were described as the Lo-Q and Hi-Q controls, but nothing was said of the conditions under which these hubs are potentialized. Since the data receiver, of which the circuits of FIG. 1 are a component part, is associated with a central data transmitter which addresses and interrogates a selected one of a plurality of remote terminals for a return response, the central receiver incorporates controls which measure the maximum time required to synchronize the receiver with the most remote terminal. The central transmitter, execpt when it is transmitting data, transmits carrier wave continuously. Thus, the receivers in all of the remote terminals are continuously adjusted to the phase of the central transmitter. When the central transmitter calls one of the remote terminals, all terminals receive the coded call signal. However, only the called terminal responds by turning on its carrier signal for transmission back to the central station. All other transmitters in the remote terminals remain off. While the central transmitter is sending command instructions (data) to the addressed remote terminal, that terminal is returning carrier signal to the central receiver. During this period, the central receiver is set to the Lo-Q mode of operation by the controls that initiated the call to the remote terminal in the first instance. The central receiver is thus prepared in the Lo-Q mode to synchronize with the carrier which is returned by the remote terminal whenever that carrier reaches the central station. The arrival time is a function of the distance of the remote terminal from the central station. Since the maximum separation is known, the time delay before switching from Lo-Q to Hi-Q operation is selected so that the most remote terminal can return sufficient carrier to effect the phase adjustment. It so happens that because of the message format, the data which follows the terminal call signal is sufficiently long that the returned carrier which is transmitted concurrently with the message from the central station is more than adequate to effect phase adjustment. Thus, when the central transtmitter begins the transmission of data following a terminal address it activates a counter which counts bit periods. When a predetermined count is achieved (conveniently seven bit periods), the counter switches the central receiver from Lo-Q to Hi-Q and alerts the receiver data recovery circuits to respond to the data, as above-described. Since during this seven bit period the receiver has achieved its coarse phase adjustment, it is within the tolerance of the data recovery circuits. Therefore, these circuits will detect the presence of all zeros, which is the carrier. However, in Hi-Q operation the final vernier phase-adjustment is achieved. When the remote transmitter sends its first binary one signal, the start signal, the central receiver will be synchronized to detect it. When the return transmission is completed, the central station returns the receiver thereat to Lo-Q operation in preparation for the next terminal response. Thus, by the combination of the coarse and fine phase adjustment, the central receiver is able to lock into phase in the minimum time and to maintain the phase relationship throughout the return transmission despite minor discrepancies between the frequency of the timing oscillators at the remote terminals and at the central station.

Turning now to several examples which illustrate the rapid synchronization which is achieved by the circuits of FIG. 1, reference is made to FIGS. 5 through 8.

Figure 5:
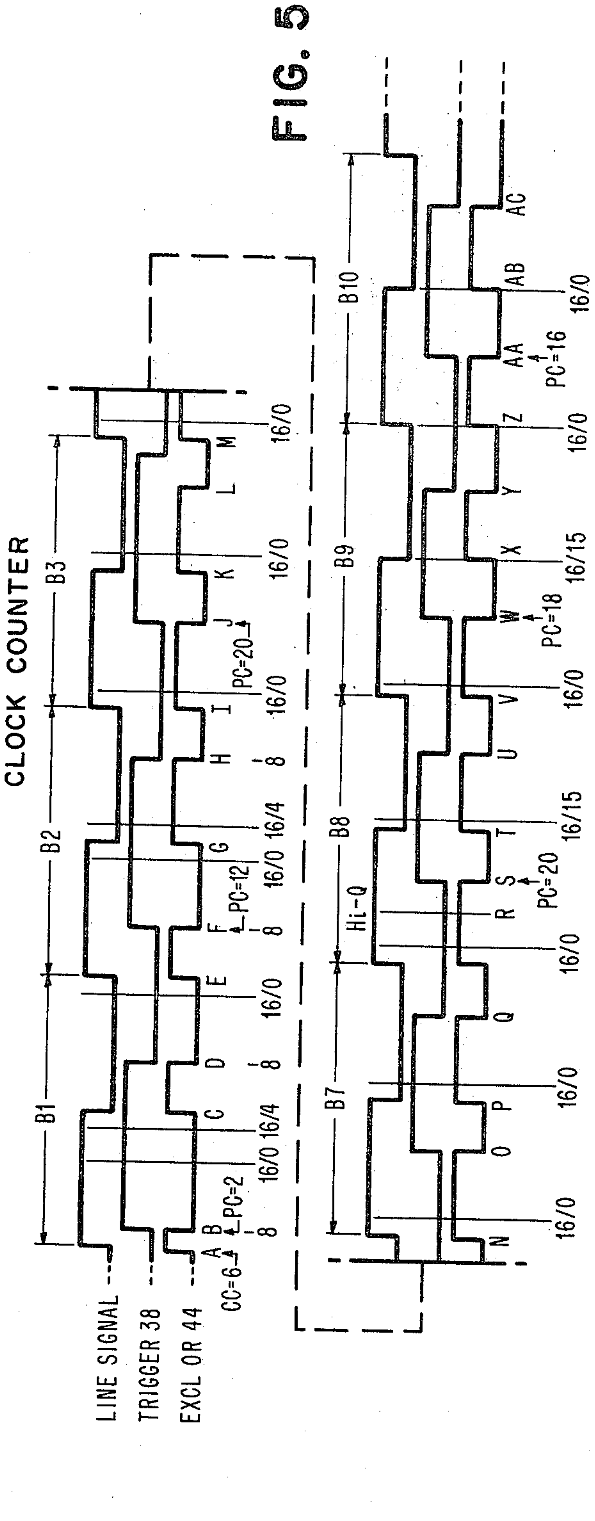
FIG. 5 is a timing diagram of the phrase adjustment circuits of FIG. 1 for a first positive line transition at a clock count of six.

In FIG. 5 there is illustrated the condition wherein the first transition of the data line 10 is positive and occurs at a clock count of six in the clock counter 12. It is further assumed that the line 10 has been sufficiently noise-free so that the circuits of FIG. 1 have not been affected thereby. With line 10 dormant, the phase counter 28 will be inactive and remain reset. The advance and retard triggers 34 and 36 will be reset. The transition detector trigger 38 and the interlock trigger 40 will be reset, as will the clock counter reset trigger 70. The clock counter will be stepping continuously and recycling normally following a count of sixteen. When the line 10 first becomes positive at point A of FIG. 5 (at a clock count of six), the trigger 38 will remain reset, thus producing a miscomparison between line 10 and trigger 38 to yield an output from EXCLUSIVE OR 44 starting at A. When at $CC=8$ (point B), trigger 38 sets to correspond to the positive condition of line 10, the readout and reset of the phase counter 28, as hereinabove described, is initiated. Since, the phase counter counts for the duration of the output from EXCLUSIVE OR 44, it will yield a count of two at point B. This count sets the retard latch 36 for a subsequent reset at a count of four. This is shown in FIG. 5 by the two closely adjacent lines bearing the scale number 16 in B1. When at point C the line 10 goes negative, while trigger 38 remains set, the EXCLUSIVE OR 44 resumes its output to gate pulses to the phase counter. This phase count proceeds from C to D when trigger 38 resets at $CC=8$. The phase counter, however, retains the count of six, as it only resets when trigger 38 turns on. At point E, the phase counter resumes its counting until point F, when trigger 38 turns on to initiate the phase counter testing and reset. The accumulated phase count of twelve ($PC<13$) sets the retard latch to cause a second reset at $CC=4$ in B2. At point G the phase count resumes and proceeds to point H when trigger 38 resets. The phase counter retains a count of ten. At point I where the line 10 goes positive, the phase count resumes and continues to point J where the turning on of trigger 38 senses the phase count of twenty. Since this count is within the Lo-Q null period ($PC=13$ to $PC=20$), no remedial action is taken. The transitions at K, L, M, N, O, P and Q preserve this phase relationship through at least the seventh bit time (B7). When in B8 the receiver switches to Hi-Q at a clock count of four, the receiver will be alerted for the phase counter reset at point S. Since the phase counter reset can only occur following a clock count of eight, the switch to Hi-Q is made before that time (arbitrarily at $CC=4$) so that the phase count may be sensed in the Hi-Q mode. Thus, at point S the phase count of twenty will not set the advance latch for a reset at a count of fifteen in B8, to bring the phase within one count of synchronism. The phase count from T to V (nine counts) plus that from V to W results in an accumulation of eighteen counts when the phase counter resets at W. This causes the clock counter to undergo a second advance reset at $CC=15$ of B9 (at point X) thus bringing the receiver into phase. The accumulation of counts from X to Y and from Z to AA results in a phase count of sixteen, requiring no remedial action. This situation will persist as can be seen from the fact that the phase counts will invariably be accumulated for the first eight counts of the clock counter to yield the requisite sixteen counts. It will be noted that the phase adjustment in Lo-Q was achieved within three bit periods, and the Hi-Q adjustment required two more bit periods to make a total of five bit periods. Of these, the first period is frequently indeterminate and may cause an adjustment in the wrong direction, because of the accumulation of only a half period of phase count before the phase counter resets. This requires at least one cycle to overcome the erroneous correction plus additional cycles to effect the final correction. In no instance will the phase descrepancy be greater than two counts when the system switches to Hi-Q. If for example, the discrepancy were three counts the Lo-Q operation would correct by four counts to leave a residual discrepancy of one count for the Hi-Q correction. It was previously stated that the system favors a retard action. Thus, while in B2 of FIG. 5, the phase of the receiver lagged by two counts, the circuits caused a retard action of four counts. This adjustment results in the data leading the clock by two counts. This is corrected by two advances in Hi-Q. The preference for a retard action is created by the lack of symmetry of the null period in Lo-Q. For example, if the transition lags the clock by two counts, the accumulated phase count will equal ten, causing a retard action. If on the other hand, the line transition leads the clock by two counts, the accumulated phase count will equal twenty, causing no remedial action in Lo-Q. Thus, the system will always adjust in the retard direction in Lo-Q for conditions wherein the line transition lags $CC=16$ by counts of two through eight. For conditions wherein the line transition leads $CC=16$ by counts of three through seven, the system will advance in Lo-Q. For conditions wherein line transition leads $CC=16$ by counts of zero, one or two counts, or lags by one count, the system will not adjust in Lo-Q. Thus, in Lo-Q the system will retard for seven conditions of mis-alignment, advance for five conditions of mis-alignment, and take no remedial action for four (including perfect alignment). As a result the system will approach Hi-Q requiring no greater than two counts of adjustment (advance), and may enter it with no further requirement for adjustment, or with a one count requirement for an advance or retard.

Figure 6:
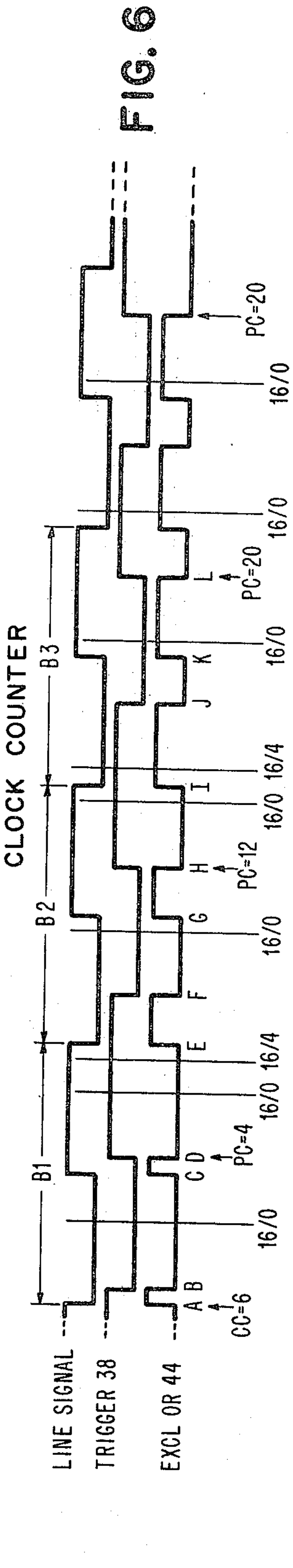
FIG. 6 is a timing diagram of the phase adjustment circuits of FIG. 1 for a first negative line transition at a clock count of six.

In FIG. 6 the phase adjustment for a first negative transition of the line 10 at a clock count of six is illustrated. Here, the initial phase count begins at point A and accumulates the correct sum of four counts for a phase maladjustment of six counts by counting from A to B and from C to D where a retard reset is initiated at a clock count of 16+4 next occurring. This produces a two count phase lag in the second bit period at point E. Phase count accumulation from E to F and from G to H results in a count of twelve, thus initiating a second retard reset. The phase relationship beginning in the third bit period results in a phase count of twenty, which count produces no remedial action in Lo-Q. When the system switches to Hi-Q the phase count of twenty will cause an advance reset at a clock count of fifteen to produce a phase count of eighteen. The final advance reset reduces the phase count to sixteen, thus yielding the same succession of events as in FIG. 5.

Figure 7:
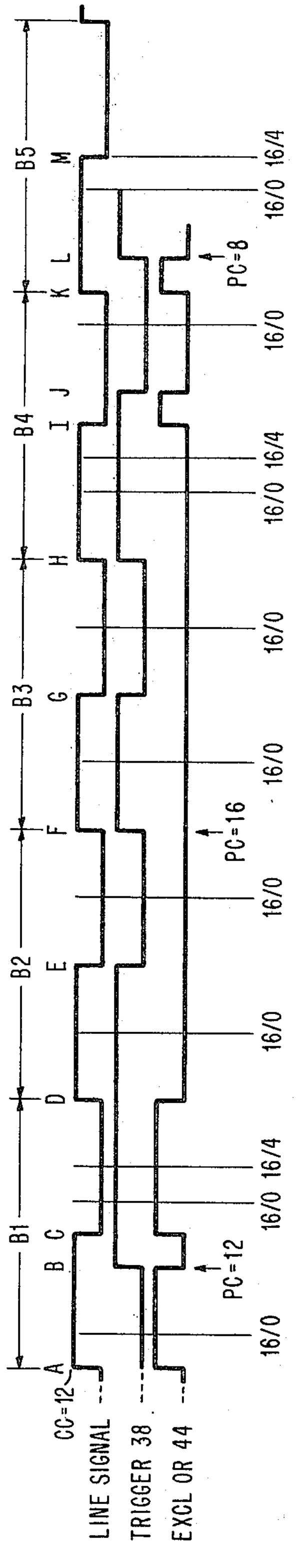
FIG. 7 is a timing diagram of the phase adjustment circuits of FIG. 1 for a particular instance of a first positve line transition at a clock count of 12.

In both of the foregoing examples, the initial remedial action was in the correct direction. If the phase difference is greater than eight counts (the line transition occurs at a clock count of $CC=9$ to $CC=15$), then the initial half cycle of phase count accumulation will result in an initial retard action for transitions from $CC=12$ to $CC=15$ and no initial action for line transitions of $CC=9$ (½ cycle phase count equals 15) through $CC=11$ (½ cycle phase counts equals 13). If the line transition occurs at a clock count of twelve ($CC=12$), the line transition actually leads the clock counter by four counts and should produce an advance reset at a clock count of twelve to achieve the correct phase relationships. However, as shown in FIG. 7, when the carrier comes on the line, the first positive transition of the line at $CC=12$ (point A) followed by a positive set of the transition detector twelve counts later (point B at $CC=8$) will find twelve counts in the phase counter. This will initiate an incorrect retard reset at $CC=4$ to produce a line transition at $CC=8$. Depending on when this line transition occurs relative to TPD time when the transition detector trigger is pulsed, the system will either retard or advance. In FIG. 7, it is assumed that the line transition, while it occurs at $CC=8$ (point D) after the first mal-adjustment, occurs prior to TPD time. Therefore, the line will be positive at TPD time to cause no change in the transition detector trigger 38. The accumulated phase count of sixteen (from C to D) remains in the counter when it stops counting at D. When at point E, line 10 goes positive just prior to TPD time at point D, the transition detector trigger 38 will remain set when it receives the TPD pulse at $CC=8$. This condition of trigger 38 will continue until at point E, line 10 goes negative (just prior to TPD time) to cause trigger 38 to reset at TPD time. Trigger 38 will thus follow the line transitions with only a very insubstantial delay from D to E to F thus yielding no output from the EXCLUSIVE OR gate 44. At point F, the positive transition of trigger 38 causes a readout and reset of the phase counter. The accumulated count of sixteen produces no remedial action, and the trigger 38 continues to follow the line transitions with substantially no delay from F to G to H, during which time the EXCLUSIVE OR 44 produces no output and phase count. At H the trigger 38 goes positive and the lack of phase count ($PC<13$) sets the retard trigger to initiate a reset at $CC=4$ next following. The four count discrepancy will yield two phase counts of four each from I to J and K to L where the phase counter resets from a total count of eight. This reset produces a further retard reset at $CC=4$ at point M, where it will be seen that the system is now in phase.

The foregoing example is an extreme one, requiring that the line transitions occur within a very narrow region. The original mal-adjustment, as can be seen, renders the phase eight counts off. This, because of the initial phase counter reset at point B from a count of twelve in the first bit period, and the attendant retard reset of the clock counter, causes the phase counter to count sixteen counts in the first bit period. This count is retained until the reset at point F where no action is signalled. The substantial coincidence of the line signal and the output of trigger 38 provides no phase count which is not detected until point H at the beginning of the fourth bit period where the retard reset brings the phase to within four counts. The final reset in the fifth bit period brings the system into adjustment. Thus, of the five bit periods required for this special case, the first is a mal-adjustment, the second and third periods produce no adjustment, and the fourth and fifth periods complete the adjustment.

By extrapolation of FIG. 7 for a first negative transition of line 10, it will be seen that a correct phase count of twenty-four would be counted initially to set the advance trigger to initiate a clock counter reset at a count of twelve, thus bringing the clock into phase within one bit period.

The phase counter, if it counts, always starts counting with the transition of the line data and receives its last count at $CC=8$. Since the transition detector trigger switches at TPD of $CC=8$, and the phase counted increments at TPA time, the incrementing pulse at TPA of $CC=8$ will always be counted. If the line transition occurs after TPA time, the next TPA pulse will be counted. Thus, the line transition can occur within the three timing pulse periods between the TPA pulses without false counting. This is the system tolerance. If the transition encroaches on the TPA time, then the transition is actually moving out of synchronism into the preceding or following clock period. This will produce a corresponding change in the phase count and a consequent correction.

Figure 8:
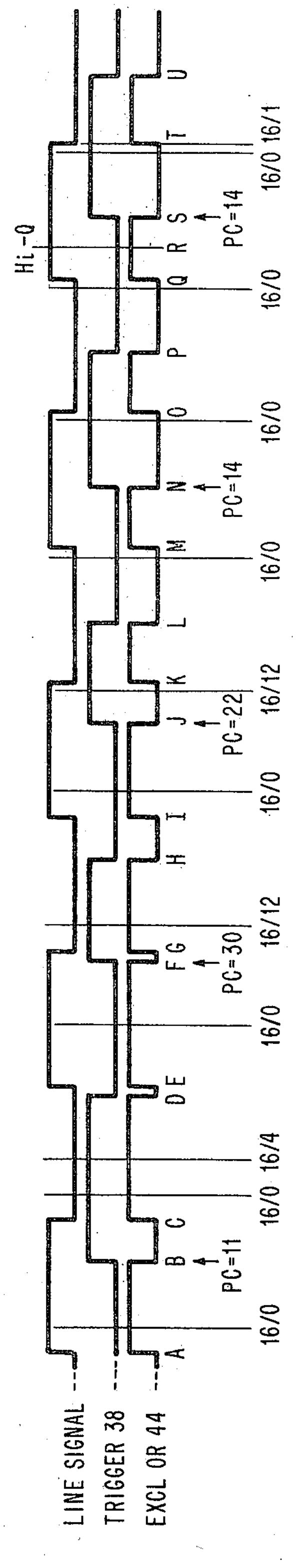
FIG. 8 is a timing diagram of the phase adjustment circuits, of FIG. 1 for a first positive line transition at a clock count of 13.

A final example meriting attention is that wherein the initial positive line transition occurs at a clock count of thirteen, which relationship is shown in FIG. 8. When at A the line 10 goes positive, the EXCLUSIVE OR 44 begins its output to gate eleven counts until trigger 38 switches at B ($CC=8$). This causes a reset at the next $CC=4$ time following point C. The switching of trigger 38 at B disrupts the phase count until C ($CC=12$) when line 10 goes negative. With the second reset (at $CC=4$) of the clock counter trigger 38 remains up to $CC=8$ (point D). Line 10 now changes state at $CC=9$ (because of the four count retard) to disrupt counting from D to E. From E to F counting resumes to yield a phase count of thirty when the counter resets. This count causes an advance reset at $CC=12$, thus bringing the clock within three counts of synchronism (where it was in the first place). The count from G to H and I to J produces a double count of eleven (twenty-two) to reset the counter at $CC=12$. Thus, the transition at point K is within one count of synchronism, and no further correction can be effected in Lo-Q because the phase count will now lie within the null zone. When the system switches to Hi-Q (at R, for example) the phase count of fourteen at point S will initiate a retard reset at $CC=1$ to bring the clock with synchronism at point T. This condition will prevail until the relative phase drifts due to lack of perfect frequency regulation of the two oscillators.

By extrapolation of the examples given, it will be seen that except for the very peculiar circumstances shown in FIG. 7, the system will achieve rapid phase adjustment. Even in the example of FIG. 7, the phase adjustment was effected within five bit periods, even though all of it was performed in the Lo-Q mode of operation.

Ignoring the initial adjustment that might arise for only a half cycle of phase count as the carrier signal appears on the line, the following is the succession of events for each of the relative phase conditions of the line and the data clock.

Lo-Q ADJUSTMENT POSSIBILITIES

| Line transition occurs at— | 1st phase count | 1st action | Transition occurs at— | 2nd phase count | 2nd action | Transition occurs at— | 3rd phase count |
|---|---|---|---|---|---|---|---|
| $CC=16$ | 16 | None | $CC=16$ | 16 | None | $CC=16$ | 16 |
| $CC=1$ | 14 | do | $CC=1$ | 14 | do | $CC=1$ | 14 |
| $CC=2$ | 12 | Retard | $CC=14$ | 20 | do | $CC=14$ | 20 |
| $CC=3$ | 10 | do | $CC=15$ | 18 | do | $CC=15$ | 18 |
| $CC=4$ | 8 | do | $CC=16$ | 16 | do | $CC=16$ | 16 |
| $CC=5$ | 6 | do | $CC=1$ | 14 | do | $CC=1$ | 14 |
| $CC=6$ | 4 | do | $CC=2$ | 12 | Retard | $CC=14$ | 20 |
| $CC=7$ | 2 | do | $CC=3$ | 10 | do | $CC=15$ | 18 |
| $CC=8$ | 0 | do | $CC=4$ | 8 | do | $CC=16$ | 16 |
| $CC=9$ | 30 | Advance | $CC=13$ | 22 | Advance | $CC=1$ | 14 |
| $CC=10$ | 28 | do | $CC=14$ | 20 | None | $CC=14$ | 20 |
| $CC=11$ | 26 | do | $CC=15$ | 18 | do | $CC=15$ | 18 |
| $CC=12$ | 24 | do | $CC=16$ | 16 | do | $CC=16$ | 16 |
| $CC=13$ | 22 | do | $CC=1$ | 14 | do | $CC=14$ | 14 |
| $CC=14$ | 20 | None | $CC=14$ | 20 | do | $CC=14$ | 20 |
| $CC=15$ | 18 | do | $CC=15$ | 18 | do | $CC=15$ | 18 |

From the foregoing tabular values it will be seen that after two adjustments in Lo-Q, the clock will be adjusted to within two counts of phase synchronism. These two counts will always require a subsequent advance of two steps, because the Lo-Q always adjusts to a transition at a clock count of fourteen rather than at two. The system, therefore, enters Hi-Q operation with the line transitions occurring at $CC=14$, $CC=15$, $CC=16$, or $CC=1$, but never at $CC=2$.

Further interpretation of the foregoing tabular values supports the quarter-bit and null period analysis previously made. If a line transition occurs within the clock periods defined by clock counts of one through eight, the transition lies in the first quarter. If the transition lies within the period defined by clock counts of nine through sixteen, it lies in the second quarter. Except for transitions within the two null periods, a first quarter transition produces a retard reset, while a transition in the second quarter produces an advance reset. The Lo-Q null period of four counts starts at a clock count of fourteen and ends with the termination of the clock period measured by the first clock count. The Hi-Q null period of one count period occupies the first count position, which, because of the change from a retard to an advance action beginning with the ninth count period, lies at the end of the second quarter. Thus, of the four lines 64, 66, 86 and 88 in FIG. 1, the line 64 signals a first quarter line transition outside the Lo-Q null period, the line 66 signals a second quarter line transition outside the Lo-Q null period, the line 86 signals a first quarter line transition, and the line 88 signals a second quarter line transition outside of the Hi-Q null period. These signals initiate respectively the Lo-Q retard and advance resets and the Hi-Q retard and advance resets of the clock counter at counts of four, twelve, one and fifteen, respectively.

Even if the initial phase adjustment, as the carrier comes on the line, is achieved in the wrong direction (because of prior noise or other conditions precedent), it will be appreciated that even a mal-adjustment must bring the phase relationship within the conditions set forth in the above table. Thus, the Lo-Q adjustment will invariably bring the phase of the receiver within two clock counts of synchronism, The remaining two possible counts of discrepancy will be adjusted in Hi-Q within two further bit periods. Therefore, within five bit periods the phase of the receiver will be locked to that of the data. The seven bit periods allowed for this function is more than adequate, and is used only because the outgoing message is of at least this duration. This additional safety factor or two bit periods allows for the transit delay of the returning carrier, since the bit period delay counting is achieved at the central station.

In accordance with the foregoing detailed explanation, it has been shown that by providing a free-running clock counter operating at a multiple of the bit frequency and a phase counter for counting the number of clock counts intervening between a transition of the data signal and a fixed clock count a measure of the lack of synchronism is obtained. This measure is used to adjust the phase of the clock counter in two degrees of resolution. The first or coarse resolution adjustment brings the phase rapidly toward the synchronized status for a final adjustment in a vernier mode. The clock counter, thus synchronized, maintains its synchronism and provides the timing for the extraction of the data from the line signal.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Means in a data receiver for adjusting the timing circuits of the receiver to operate in phase with a bi-phase binary data bearing signal line in which one of the binary datum bits is transmitted as two half-bit periods of opposite polarity signals having the identical phase of the datum bit preceding it, and the other binary datum bit is transmitted as two half bit periods of opposite polarity signals having a phase opposite to that of the datum bit preceding it, comprising:

(a) a cyclical device means having a cycle time substantially equal to the period of the data and operable to control the extraction of the data from the line signal;

(b) first means including means under control of said cyclical device for testing the line signal and producing a digital count manifestive of the magnitude and direction of the phase difference between said cyclical device and said line signal;

(c) and second means responsive to said first means including means for successively precessing the cycle of said cyclical device with respect to the data in steps, said steps having two different degrees of resolution with the first occurring precessive steps acting to reset said cyclical device toward synchronization in increments that are greater than those provided by the second occurring precessive steps.

2. The apparatus of claim 1 wherein said cyclical device means includes a free-running clock counter operable to accumulate sixteen counts twice per bit period to provide the requisite control for the extraction of data at successive count positions of eight thereof.

3. The apparatus of claim 2 wherein said means for testing the line signal and producing a digital count manifestive of the magnitude and direction of the phase difference includes a phase counter operable to accumulate clock counts for two successive time intervals separating each to accumulate clock counts for two successive time intervals separating each of two line transitions and the next following clock count of eight, to yield signals manifestive of positive and negative phase differences greater than two different given magnitudes.

4. The apparatus of claim 3 wherein the means for successively precessing the cycle of said cyclical device includes advance and retard triggers selectively set by the count signals in said phase counter, and circuits operative under the respective control of said triggers to reset said clock counter at counts in advance of and following the normal reset of the counter.

5. Means in a data receiver for adjusting the timing circuits of the receiver to operate in phase with a bi-phase binary data signal in which one of the binary datum bits is transmitted as two half-bit periods of opposite polarity signals having the identical phase of the datum bit preceding it, and the other binary datum bit is transmitted as two half-bit periods of opposite polarity signals having a phase opposite to that of the datum bit preceding it, comprising:

(a) a free-running clock counter operative when properly phased with the data signal to control the extraction of data therefrom;

(b) means for measuring the magnitude and direction of the phase difference between the operation of said clock counter and said data signal;

(c) means under control of the means for measuring the phase difference for resetting said counter at one of four given count positions, whereby the counter may be advanced or retarded with respect to the data, when reset at one of the given count positions;

(d) and means for sequentially activating successive pairs of reset count positions, the first operated pair of which is separated from the maximum counter count by a greater number of counts than the second pair of counter reset positions, whereby the phase of the counter is adjusted in phase with two successive degrees of resolution.

6. Means in a data receiver for adjusting the timing circuits of the receiver to operate in phase with a bi-phase binary data signal in which one of the binary datum bits is transmitted as two half-bit periods of opposite polarity signals having the identical phase of the datum bit preceding it, and the other binary datum bit is transmitted as two half-bit periods of opposite polarity signals having a phase opposite to that of the datum bit preceding it, comprising:

(a) a free-running clock counter operative to cyclically increment a given number of times per bit period, to thus divide the bit period into halves and into quarters, the maximum count of said counter being equal to a multiple of four;

(b) means under the joint control of said clock counter and of a transition in the data signal for detecting the presence of a transition within first and second quarters of each of the half-bit periods and without null periods of two different predetermined durations, and producing four signals respectively manifestive of the four combinations of possible locations of the transitions within the two quarters and without the two null periods;

(c) means under control of each of said four signals for resetting said counter at a different respective predetermined count thereof, to thereby adjust the relativity of the count in the counter to the data signal;

(d) and means for sequentially activating the counter reset circuits to first operate responsive to signals manifesting a transition without the longer of the two null periods and then to operate responsive to signals manifesting the presence of a transition without the shorter of the two null periods.

7. The apparatus of claim 6 wherein the clock counter counts to sixteen twice per bit period.

8. The apparatus of claim 7 wherein the means under the joint control of the clock counter and of a transition in the data signal includes a phase counter which counts the number of clock counts intervening between two successive line transitions and a clock count of eight and yielding a first signal responsive to a phase count less than thirteen manifestive of a line transition within the first quarter period and without the greater null, a second signal responsive to a phase count greater than twenty manifestive of a line transition within the second quarter and without the greater null period, a third signal responsive to a phase count less than sixteen manifestive of a line transition in the first quarter and without the lesser null period, and a fourth signal operative responsive to a phase count greater than sixteen manifestive of a line transition within the second quater and without the lesser null period.

9. The apparatus of claim 8 wherein the means for resetting said counter operates responsive to said first signal to reset said counter at a count of four, to said second signal to reset said counter at a count of twelve, to said third signal to reset said counter at a count of one, and to said fourth signal to reset said counter at a count of fifteen.

10. The apparatus of claim 9 wherein said means for sequentially activating the counter reset circuits is operative to first activate the reset circuits at counts of four and twelve for a given number of bit periods followed by reset at one and fifteen to provide two degrees of adjustment resolutions.

11. Means in a data receiver for adjusting the timing circuits of the receiver to operate in phase with a bi-phase binary data signal in which one of the binary datum bits is transmitted as two half-bit periods of opposite polarity signals having the identical phase of the datum bit preceding it, and the other binary datum bit is transmitted as two half-bit periods of opposite polarity signals having a phase opposite to that of the datum bit preceding it, comprising:

(a) a free-running clock counter operative to accumulate sixteen counts twice per bit period;

(b) a first bi-stable trigger;

(c) means under control of said counter for switching said trigger to a stability state corresponding to the data signal polarity at a count of eight in said counter;

(d) an EXCLUSIVE OR gate connected to the output of said trigger and said data line and operative to yield an output upon a mis-comparison of the inputs connected thereto;

(e) a phase counter operative when activated to accumulate counts at the same rate as said clock counter;

(f) means under control of said EXCLUSIVE OR gate for activating said phase counter to accumulate count for the duration of the output from said EXCLUSIVE OR gate;

(g) an interlock trigger operative under control of said counter and said first trigger for switching its state to correspond to that of said first trigger following a brief delay;

(h) an AND gate connected to said first trigger and to said interlock trigger and operative responsive to a first state of said first trigger and a second state of said interlock trigger for yielding an output, whereby said AND gate will yield a short output response following a given direction of a line transition;

(i) means responsive to an output from said AND gate for resetting said phase counter and producing output responses therefrom of a count therein prior to a reset of less than thirteen greater than twenty, less than sixteen and greater than sixteen;

(j) a retard trigger;

(k) means for selectively setting said retard trigger when said phase counter is reset in response to a phase count of less than thirteen or less than sixteen;

(l) an advance trigger;

(m) means for selectively setting said advance trigger when said phase counter is reset in response to a phase count greater than twenty or greater than thirteen;

(n) means responsive to the setting of said retard trigger for selectively resetting said clock counter at a clock count of four or at a clock count of one;

(o) means responsive to the setting of said advance trigger for selectively resetting said clock counter at a clock count of twelve counts or at a clock count of one;

(p) and means for sequentially controlling the selection of the setting of said retard and advance triggers and the resetting of said clock counter such that the said triggers first set in response to phase counts of less than thirteen and greater than twenty and said counter resets at counts of four and twelve respectively, followed by a set of said triggers at phase counts of less than sixteen and greater than sixteen and the counter resets at one and fifteen respectively; whereby the said clock counter will be retarded or advanced in increments of four counts each only when such adjustment will decrease the mal-adjustment, followed by successive adjustments of one count each in the forward or reverse directions to complete and maintain the phase adjustment.

References Cited

UNITED STATES PATENTS

| | | | |
|---|---|---|---|
| 3,141,930 | 7/1964 | Krauss | 178—69.5 |
| 3,160,821 | 12/1964 | Farrow | 328—155 |
| 3,349,330 | 10/1967 | Wedmore | 178—67 X |
| 3,376,385 | 4/1968 | Smith et al. | 178—69.5 |
| 3,402,264 | 9/1968 | Ellis et al. | 178—69.5 |
| 3,404,230 | 10/1968 | Hailey et al. | 178—69.5 |
| 3,411,090 | 11/1968 | Lescinsky | 178—69.5 X |

ROBERT L. GRIFFIN, Primary Examiner

J. A. BRODSKY, Assistant Examiner

U.S. Cl. X.R.

178—69.5, 88; 325—30, 320, 322, 325; 328—155